No. 880,113. PATENTED FEB. 25, 1908.
W. H. VOSS.
GEAR CASE FOR MECHANICAL MOVEMENTS.
APPLICATION FILED JAN. 15, 1906.

Witnesses:
Inventor:
William H. Voss
by Franks Thomason
Atty

UNITED STATES PATENT OFFICE.

WILLIAM H. VOSS, OF DAVENPORT, IOWA.

GEAR-CASE FOR MECHANICAL MOVEMENTS.

No. 880,113. Specification of Letters Patent. Patented Feb. 25, 1908.

Application filed January 15, 1906. Serial No. 296,151.

*To all whom it may concern:*

Be it known that I, WILLIAM H. VOSS, a citizen of the United States, and a resident of Davenport, in the county of Scott and State of Iowa, have invented certain new and useful Improvements in Gear-Cases for Mechanical Movements, of which the following is a clear, full, and exact description.

My invention relates to a suitable casing or covering for inclosing mechanical movements of rotary washing machines, and particularly that shown and described in Letters Patent of the United States granted to me January 1, 1901, No. 664,911.

The object of my invention is to provide a cheap and simply constructed casing, which can be readily opened to permit access to the mechanism therein and closed without the use of special tools or the loosening of screws or bolts. This I accomplish by the means hereinafter fully described and as particularly pointed out in the claims.

Figure 1:
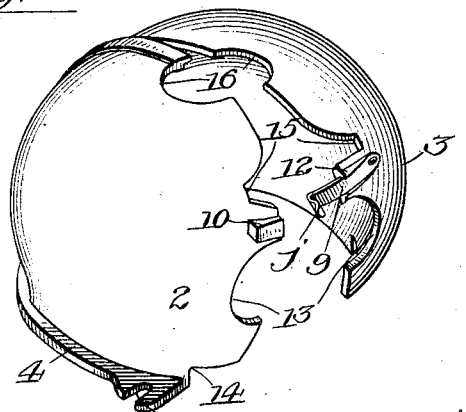
Figure 4:
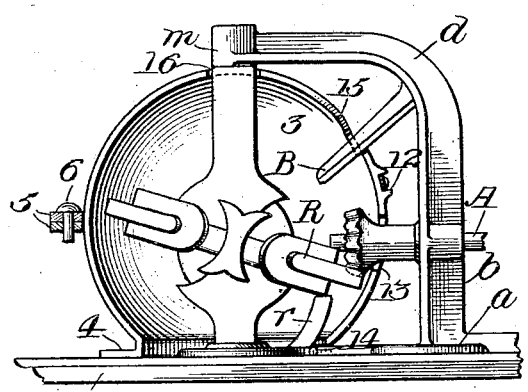
Figure 2:
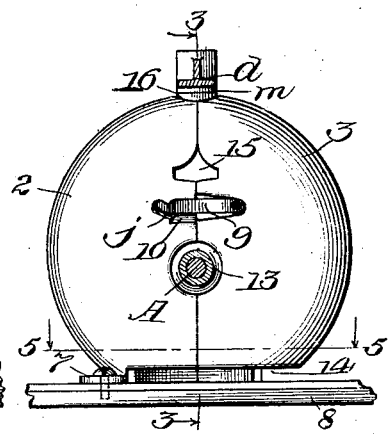
Figure 5:
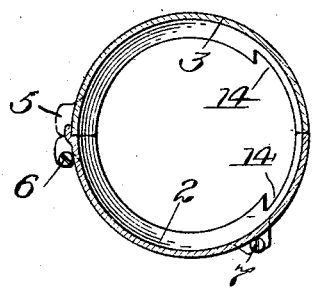
Figure 3:
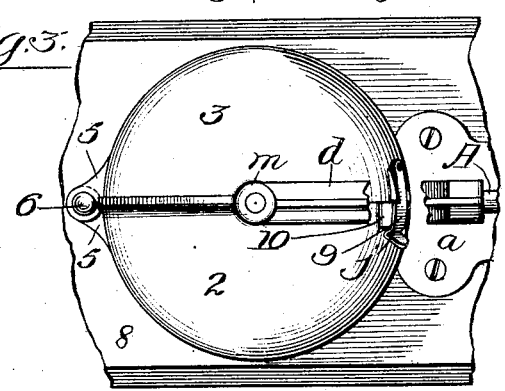

In the drawings:—Figure 1 is a perspective view of my improved gear case showing it open. Fig. 2 is a side view of a mechanical movement showing my improvement applied thereto. Fig. 3 is a plan view of the same. Fig. 4 is a vertical transverse section taken on dotted line 3—3, Fig. 2. Fig. 5 is a horizontal section of my improved invention taken on dotted line 5—5, Fig. 2.

Referring to the drawings A represents the continuously revolving drive-shaft of a mechanical movement such as is usually employed in rotary washing machines, which is journaled in bearings in a suitable supporting-frame, comprising a screw-plate $a$, standard $b$, in which said bearings are made, and a goose-neck $d$ extending up from standard $b$. The screw-plate of this frame extends beyond the standard $b$ and it and the extremity of the goose-neck are provided with bearings for the vertical shaft, which latter is given a rotary reciprocal movement by means of a rotary reciprocal tilting rack R concentric thereto and connected therewith in such manner as to be free to rotate with the shaft but capable of independently tilting up and down upon the same. This rack is engaged by a spur-wheel on the adjacent end of the drive-shaft extending beyond the standard $b$, and the tilting movement of the rack is limited by a suitable lug $r$ rising from the screw-plate, and a lug B projecting downwards from the underside of the overhanging goose-neck $d$, as shown. It is unnecessary to enter into an extended description of the mechanical movement just referred to, suffice it to say that the gear case embodying the invention it is desired to cover herein, is for the purpose of inclosing this mechanical movement, or any other mechanical movement the construction of which will permit its use so as to render said movement both dust-proof and accident-proof.

My invention comprises a spheroidal shaped shell the under portion of which is cut away, leaving circular lower edges 4, 4, which are flanged outwards. This spheroidal shell is divided into two equal sections 2, 3, the meeting edges of which are in the vertical intersecting center of the drive-shaft. These sections are, diametrically opposite the drive-shaft, about midway their height provided with knuckles 5, 5, which are connected by a suitable pintle 6, to form a hinge connecting the two. The ends of the flanges of the lower edges of section 2 are, preferably, extended slightly farther than the remainder of the flange thereof, and are provided with slots 7 of such depth and width that screws may be set therein and screwed into the cover 8 or other support of the machine to securely hold said section 2 rigidly in place. Section 3, however, is not rigidly secured to the support of the machine, but at a point opposite where it is hinged to section 2, it is provided with a flat spring snap-hook 9, one end of which latter is riveted thereto, and has its other end extend transversely beyond its meeting edge, and its unsecured extremity $j$ bent inwards and then outwards to form a hook, that snaps over a suitable lug 10 on section 2 and hold said sections securely together. If desired, section 3 may have ridges 12, 12, built on either side of the spring hook 9 to prevent any side movement thereof.

This gear covering is provided with a suitable opening 13 therein diametrically opposite its hinge, by cutting into the meeting edges, half in one section and half in the other, through which the adjacent extended end of the drive-shaft extends into the gear covering. The lower edges of the gear case below opening 13 are recessed as shown at 14 to accommodate the passage of the screw-plate of the supporting-frame of the movement into said gear case, and above opening 13 and spring snap 9 there is an opening 15 to admit the entrance into the case of the lug B and at the top of the case there is a circular opening 16 down through which the bearing boss m on the extremity of the goose-neck of the supporting-frame enters. The recesses 14, the opening 15, and the opening 16 are made by correspondingly recessing or cutting away the meeting edges of the two sections 2 and 3 of the gear case in the same manner as for opening 13.

As thus constructed all that has to be done, in order to have access to the movement inclosed within the gear case, is to loosen the spring snap hook and swing the section 3 away from section 2, as shown. In order to protect mechanical movements constructed differently from that hereinbefore described, it is obvious that the lugs in the openings in the meeting edges of said sections might be changed, or openings made in the stationary section of the case, should it be deemed advisable. All such changes, contemplating the use of a stationary section and a hinged section, having their meeting edges coming together in a vertical plane and adapted to be locked together by temporary means, I desire to be considered as within the scope of my invention.

What I claim as new is:—

1. A mechanical movement for washing machines comprising a continuously revolving horizontal drive-shaft, a rotary reciprocal driven shaft arranged substantially at right angles thereto and in the same vertical plane therewith and having its upper end extend through its bearings and terminate adjacent to the contiguous end of said drive-shaft, a supporting-frame in which said shafts are journaled, gearing for connecting the contiguous ends of said shafts and communicating the motion of said drive-shaft to said driven shaft, and a casing consisting of two hemispherical sections inclosing said gearing and suitably locked together whose meeting edges are in the same vertical plane with said shafts and one of which is rigidly secured in position and the other hinged thereto.

2. A mechanical movement for washing machines comprising a continuously revolving horizontal drive-shaft, a rotary reciprocal driven shaft arranged substantially at right angles thereto and in the same vertical plane therewith and having its upper end extend through its bearings and terminate adjacent to the contiguous end of said drive-shaft, a supporting-frame in which said shafts are journaled, gearing for connecting the contiguous ends of said shafts and communicating the motion of said drive-shaft to said driven shaft, and a casing consisting of two hemispherical sections inclosing said gearing hinged together opposite the end of said drive-shaft, said sections having their meeting edges in the same vertical plane with said shafts and one of which is rigidly secured to its support.

3. A mechanical movement for washing machines comprising a continuously revolving horizontal drive-shaft, a rotary reciprocal driven shaft arranged substantially at right angles thereto and in the same vertical plane therewith and having its upper end extend through its bearings and terminate adjacent to the contiguous end of said drive-shaft, a supporting-frame in which said shafts are journaled, gearing for connecting the contiguous ends of said shafts and communicating the motion of said drive-shaft to said driven shaft, and a casing consisting of two hemispherical sections inclosing said gearing hinged together opposite the end of said drive-shaft and provided with means opposite said hinge for locking the same together, said sections having their meeting edges in the same vertical plane with said shafts and one of which is rigidly secured to its support.

4. A gear case for mechanical movements comprising two hemispherical sections whose meeting edges are in a vertical plane, which are hinged together mediate their tops and bottoms, and have recesses in their meeting edges whereby openings into said case are provided, one of said sections being rigidly secured to its support, and the other provided with a transverse spring snap hook whereby said sections are locked together.

5. A gear case for mechanical movements comprising two hemispherical sections whose meeting edges are in a vertical plane adapted to aline with the axis of the drive-shaft of a mechanical movement, which are hinged together mediate their tops and bottoms, and have recesses in their meeting edges whereby openings into said case are provided, one of said sections being rigidly secured to its support, and the other provided with a transverse spring snap hook whereby said sections are locked together.

6. A gear case for mechanical movements comprising two hemispherical sections which have their lower portions cut away, their resultant edges flanged outwards, and their meeting edges being in a vertical plane and suitably locked together and one of which is rigidly secured in position and the other hinged thereto.

7. A gear case for mechanical movements comprising two hemispherical sections one of which is stationary, said sections having their lower portions cut away and the resultant edges flanged outwards and having the remainder of their edges in a vertical plane and hinged together mediate their tops and bottoms, and provided with a spring snap hook opposite their hinge.

8. A gear case for mechanical movements comprising two hemispherical sections having their lower portions cut away and the resultant edges flanged outwards, whose meeting edges are in a vertical plane, and are hinged together mediate their tops and bottoms, and have recesses in their meeting edges whereby openings into said case are provided, one of said sections being rigidly secured to its support, and the other provided with a transverse spring snap hook whereby said sections are locked together.

9. A gear case for mechanical movements comprising two hemispherical sections having their lower portions cut away and the resultant edges flanged outwards and having their meeting edges in a vertical plane adapted to aline with the axis of the drive-shaft of a mechanical movement and suitably locked together, and one of which is rigidly secured in position and the other hinged thereto.

10. A gear case for mechanical movements comprising two hemispherical sections one of which is rigidly secured to its support, said sections having their lower portions cut away and the resultant edges flanged outwards; whose meeting edges are in a vertical plane adapted to aline with the axis of the drive-shaft of a mechanical movement, said sections being hinged together mediate their tops and bottoms and being provided with a spring snap hook opposite their hinge.

11. A gear case for mechanical movements comprising two hemispherical sections having their lower portions cut away and the resultant edges flanged outwards whose meeting edges are in a vertical plane adapted to aline with the axis of the drive-shaft of a mechanical movement, which are hinged together mediate their tops and bottoms, and have recesses in their meeting edges whereby openings into said case are provided, one of said sections being rigidly secured to its support, and the other provided with a transverse spring snap hook whereby said sections are locked together.

In testimony whereof I have hereunto set my hand this 23rd day of December, 1905.

WILLIAM H. VOSS.

Witnesses:
WILLIAM E. PULS,
ARTHUR CLIFFORD.